United States Patent [19]

Waldorf et al.

[11] 4,066,934
[45] Jan. 3, 1978

[54] MOTOR SPEED CONTROLLER

[75] Inventors: Lindsey E. Waldorf; Kenneth E. Monroe, both of Ann Arbor, Mich.

[73] Assignee: Lindsey E. Waldorf, Ann Arbor, Mich.

[21] Appl. No.: 570,628

[22] Filed: Apr. 23, 1975

[51] Int. Cl.² .............................................. H02P 5/00
[52] U.S. Cl. .................................... 318/139; 318/332; 318/341
[58] Field of Search ....................... 318/139, 332, 341

[56] References Cited

U.S. PATENT DOCUMENTS

| | | | |
|---|---|---|---|
| 3,223,909 | 12/1965 | Sensing et al. | 318/139 |
| 3,349,309 | 10/1967 | Dannettell | 318/139 X |
| 3,441,827 | 4/1969 | Payne | 318/332 |
| 3,716,767 | 2/1973 | Kuriyama et al. | 318/139 |
| 3,855,520 | 12/1974 | Stich | 318/139 X |

*Primary Examiner*—Gene Z. Rubinson
*Attorney, Agent, or Firm*—Krass & Young

[57] ABSTRACT

A control system for powering the direct current drive motor of an electric vehicle from a storage battery employs a semi-conductor switch to connect the battery to the motor. Speed control of the vehicle is achieved through operator control of an accelerator which provides an analog output voltage. A multi-vibrator provides a bi-valued output signal varying between 100% on time and 100% off time as a function of the accelerator output. The motor energizing switch is conditioned by this output and by the output of a circuit which compares the motor armature current to a reference value. The circuit includes protection elements so that the switch is opened when the armature current exceeds a preset maximum and is allowed to close again if the multivibrator is still in an "on" mode when the armature current decays below a lower preset value.

5 Claims, 4 Drawing Figures

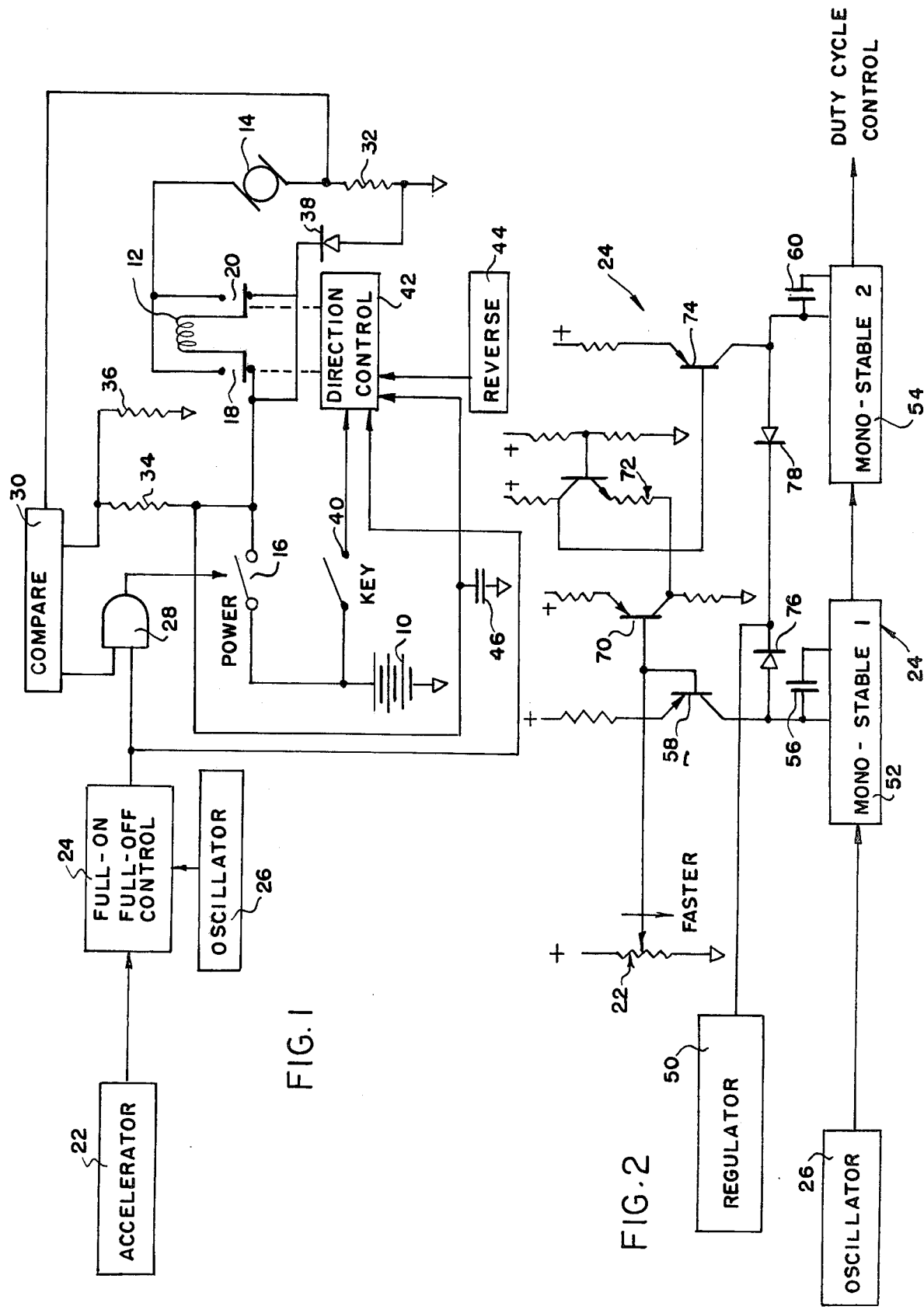

FIG. 3

| Label | Signal |
|---|---|
| A | OSCILLATOR 26 — 000 TIME, RETRIG, RETRIG, RETRIG |
| B | MONO 1 |
| C | MONO 2 — NEVER GETS TRIGGERED |

DEPRESS ACCELERATOR

| Label | Signal |
|---|---|
| D | MONO 1 |
| E | MONO 2 |

DEPRESS FURTHER

| Label | Signal |
|---|---|
| F | MONO 1 |
| G | MONO 2 |
| H | MONO 1 |
| I | MONO 2 |

MOTOR SPEED CONTROLLER

BACKGROUND OF THE INVENTION

1. Field of the Invention

This invention relates to a circuit for controlling the power applied to the drive motor of an electric vehicle from the battery of the type employing a semi-conductor switch and duty cycle control for the switch.

2. Prior Art

The development in recent years of high power, relatively low cost semi-conductor switches has led to their frequent employment in switching, duty cycle adjustment, speed control systems for direct current motors. The switches are disposed in series with a DC power source and the motor and the "on" time of a multi-vibrator controls the closure of the switches and according the power applied to the motor.

Controlled rectifiers are used as the switching element in many power control systems and transistors, which have the virtue of eliminating the need for complicated turnoff circuits in DC applications are employed in others. Typically, the semi-conductor switches used in these motor control units are controlled by the output of a multi-vibrator. The multi-vibrators are fed by an oscillator and controlled by a signal derived from the accelerator so as to vary the ratio of "on" time to "off" time during the period between two oscillator cycles. Typically, the output of these multi-vibrators may be adjusted continuously between two extremes: at one extreme the multi-vibrator is at full "off" and no power is delivered to the motor from the batteries through the switches; at the other extreme the multi-vibrator is only in the "off" state for a small percentage of each switching period. A conventional multi-vibrator is incapable of shifting its state between 100% "on" and 100% "off".

When controlled rectifiers are used as the semi-conductor switch, the mandatory "off" portion of each clock cycle is increased by the time required to recharge the turn-off capacitor. As a result of this "rest period" in each clock cycle, full battery power is never delivered to the motor and the battery must be designed to have a greater power delivery capacity than would be the case if full battery power could be delivered to the load.

One of the objects of the present invention is to use transistors as semi-conducting switching elements in order to eliminate the need for the non-conductive time associated with recharge of the turn-off capacitor and to use a unique multi-vibrator to power the switch which is capable of providing control over a full range from continuously "off" to continously "on".

In addition to the speed or power control switching provide to the accelerator and other appropriate speed control, such DC motor drive circuitry must be provided with over-current protection for the motor. With convention controlled rectifier systems over-current protection has taken the form of means for sensing the current through the motor and firing the turn-off capacitor if the motor current exceeds a predetermined value. Because of the need to recharge the turn-off capacitor, the turn-off is typically continued through the balance of the clock period, often resulting in a series of sharp current surges through the motor when an excessive current occurs.

SUMMARY OF THE INVENTION

The present invention, in its broadest aspect, is directed toward a DC power controller for an electric vehicle employing a bi-stable device continuously adjustable between 100% "on" and 100% "off" during the intervals defined by clock pulses provided to it by an oscillator. The unique multi-vibrator, or pulse width modulator, employs a pair of conventional re-triggerable mono-stable multi-vibrators with the output of the first multi-vibrator providing the input to the second. The multi-vibrators are each provided with a variable time constant current source. The sources are controlled by the accelerator output signal so as to have complementary outputs: as the accelerator output signal increases, the output of one current source increases and the output of the other current source decreases. The first multi-vibrator is triggered into conduction at regular intervals by an oscillator. Its current source provides a high current when the accelerator output is low so that its high period, following a clock pulse, is inversely proportional to the accelerator signal. When the accelerator signal is at a minimum, the high period of this first multi-vibrator exceeds its triggering interval so it's output is constantly high. Accordingly, it does not provide any retriggering pulses to the second mono-stable multi-vibrator and that second multi-vibrator's output is continously low. As the accelerator signal increases, the time period of the first multi-vibrator decreases and the time period of the second multi-vibrator increases. As a result the "on" time of the second multi-vibrator gradually increases. At the maximum accelerator output the time period of the second multi-vibrator exceeds the interval between the retriggering pulses that it receives from the first multi-vibrator and the circuit provides a 100% "on" duty cycle.

In the preferred embodiment of the invention the outputs of the second mulit-vibrator are used to control the base voltage of a group of parallel transistors having their emitter-collector path disposed in series with the battery and the motor. The switching of these transistors into the "on" mode can also be inhibited by a signal derived from a comparison of a signal proportional to the current flowing through the motor and a two-level reference signal. The reference signal has a first, high level when the transistors are conductive. When the motor current signal exceeds this level the transistors are switched off. The reference signal then reduces to a second lower level and as soon as the motor current signal decays below the second lower level the inhibition on firing is removed and if the multi-vibrator is still providing an "on" signal, conduction of the transistors resumes. The preferred circuitry includes a free-wheeling diode shunting the motor to allow a current flow through the motordiode path after conduction through the transistors terminates. This flow is produced by the energy stored in the motor by virtue of its inductance. Accordingly, the current decay upon termination of transistor conduction is relatively slow and by proper adjustment of the lower reference value the motor may be protected against excess current without being subjected to sharp current surges characteristic of prior art current limiting techniques.

The preferred embodiment of the invention employs relatively low cost germanium transistors and eliminates leakage through use of a base bias voltage substantially in excess of the battery voltage, derived from a voltage doubler circuit.

The provision of parallel, low-cost transistors allows the system of the present invention to be adapted to a wide range of power levels through the simple addition or removal of transistors without modifying the basic circuit design.

Several unique safety circuits are also employed in the preferred embodiment of the invention.

In an alternative embodiment of the invention to avoid abrupt motor speed changes which would tend to produce over-current conditions, speed regulation is aided by controlling the frequency of the oscillator which triggers the first stage of the duty cycle control multi-vibrator through a unique speed sensing arrangement wherein the counter E.M.F. of the motor is measured during those intervals when the semi-conductor switches are off. This voltage is integrated producing a signal proportional to the motor speed which is applied to a voltage controlled oscillator so as to adjust the oscillator rate as a direct function of the motor speed. Accordingly, when the vehicle is travelling relatively fast more sensitive current control can be achieved because of the higher trigger pulse rate.

Other objects, advantages, and applications of the present invention are made apparent by the following detailed description of several preferred embodiments of the invention. The description makes reference to the accompanying drawings in which:

FIG. 1 is a partially schematic partially block diagram of a preferred embodiment of the control circuit;

FIG. 2 illustrates the full-on full-off control unit 24 in greater detail;

FIG. 3 is a diagram of wave forms occurring at various points in the circuit of FIG. 1 for differing accelerator positions.

Figure 4:
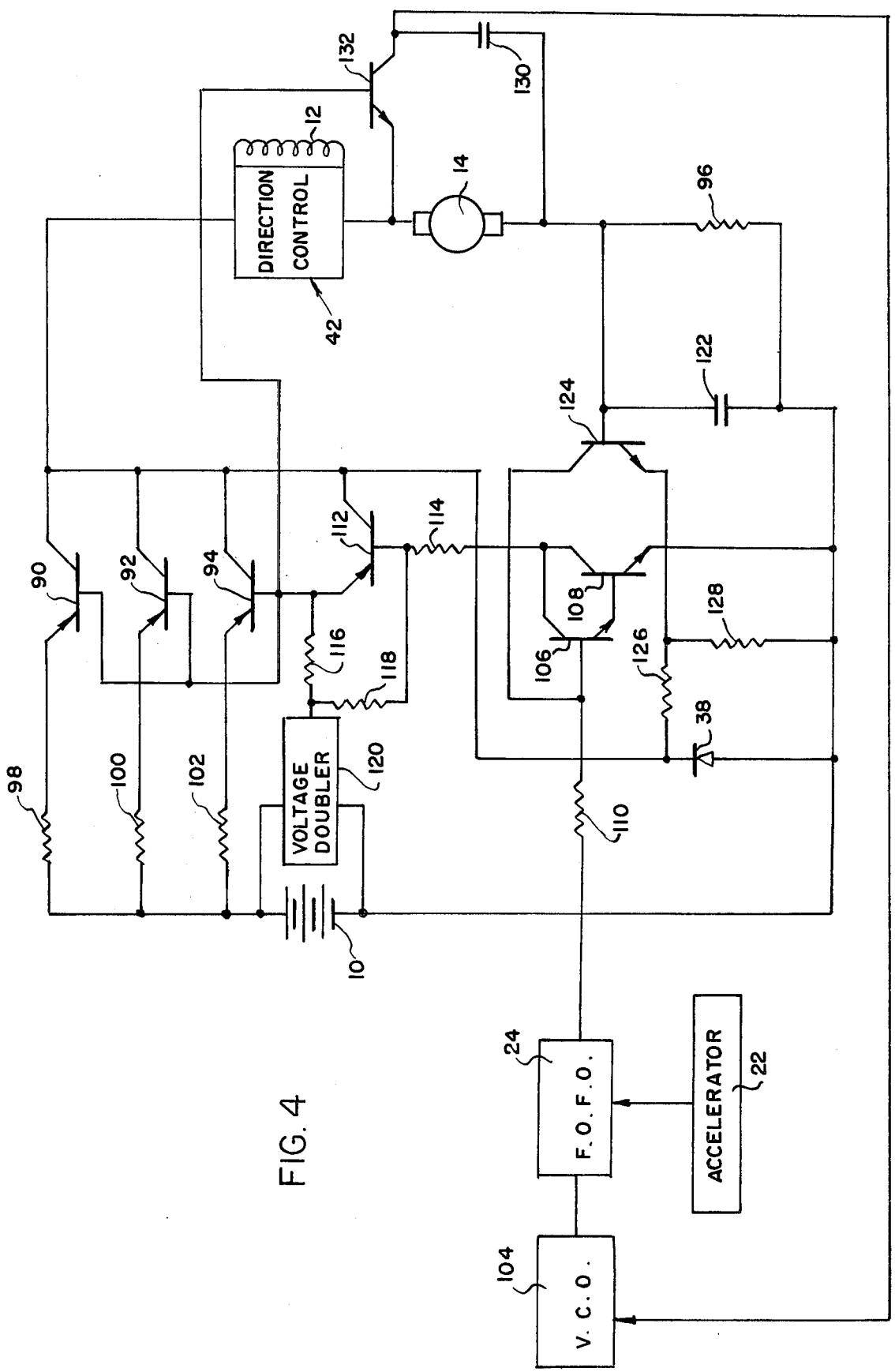
FIG. 4 is a partially block, partially schematic diagram of a variation on the circuitry of FIG. 1.

Referring to the drawings, FIG. 1 discloses a broad arrangement of the power control system for a battery operated vehicle. DC power is provided by a storage battery 10 and applied to a DC driving motor having a field winding 12 and an armature 14. A power switch 16 taking the form of a semi-conductor switch is connected in series with the battery 10, the field 12 and the armature 14 through a pair of single-pole double-throw switches 18 and 20, which constitute a reversing switch for the field winding 12.

An accelerator control 22, normally foot operated, provides an electrical output signal proportional to its control position. The accelerator may employ a potentiometer or any other form of transducer for converting the position of a manual control element to an electrical signal. The output of the accelerator 22 is applied to a full on, full off control unit 24, which essentially constitutes the unique multi-vibrator circuit having a ratio of "on" time to "off" time which is continuously adjustable between full on and full off during periods determined by the clock pulses provided by an oscillator circuit 26. The structure of the multi-vibrator circuit 24 will be subsequently described in detail.

The output of the multi-vibrator 24 is used to condition an AND gate 28, also conditioned by the output of a comparator circuit 30. The comparator 30 acts to prevent the application of excess current to the motor. In the absence of excess current it provides a high output so that when the control circuit 24 is "on" or high the AND gate normally provides a high output. This output controls the closure of the semi-conductor power switch 16 so that in the absence of an excess motor current the duty cycle of the power switch 16 is the same as that of the control 24 and is accordingly a direct function of the position of the accelerator 22.

The comparator 30 acts to compare the current passing through the motor, as sensed by a series resistor 32, with a reference voltage level provided by a voltage divider consisting of a pair of resistors 34 and 36. The voltage divider is connected between the output terminal of the power control switch 16 and ground. When the power control switch 16 is opened, no voltage is applied to the divider 34-36 and accordingly the reference level applied to the comparator 30 is at a zero level. When the power switch 16 is closed, current flows through the resistor pairs 34 and 36 and established a positive voltage as the reference level. These reference levels act as bias voltages for a transistor in the comparator as will be subsequently described so that the comparator provides a high output when the motor current is less than a first level when the switch 16 is closed or falls below a lower level when the switch is open.

Before the power switch is closed at the beginning of operation of the vehicle, there is no current flowing through the motor and the comparator provides a high output, enabling the gate 28. When the full on, full off control 24 is initiated to provide a high output, the power switch 16 is closed and current begins to flow through the motor. It establishes a voltage across the divider 34, 36 and provides a high reference level to the comparator 30. If the current flowing through the motor, sensed by the voltage across the resistor 32, exceeds the reference value, the comparator output will go low, opening the gate 28 and power switch 16. Because of the power stored in the inductance of the motor, current will continue to flow through a free-wheeling diode 38 which shunts the motor armature 14, field 12 and the current sensing resistor 32. Accordingly, positive voltage will be applied to the comparator 30 through the resistor 32. This voltage will be compared with the low reference level provided by the voltage divider 34 and 36 when the power switch 16 is open and accordingly the power switch 16 will remain open until the current through the motor decays below a level which is less than the level at which the switch 16 was opened by the comparator initially.

A key switch 40 which allows the vehicle to start enables a direction control circuit 42. The direction control circuit controls the two switches 18 and 20. In the absence of any power from the direction control circuit both of the switches 18 and 20 are in their normal positions and the motor field 12 is short-circuited. When the key switch 40 is closed, one or the other of the switches 18 and 20 are energized by the direction control circuit 42 so as to complete the motor circuit. The switch that is closed by the direction control circuit 42 is determined by a manual reverse switch 44. The direction control circuit also receives an input from an integrating capacitor 46 which receives the output of the power switch 16 and an input from the output of the full-on, full-off control switch 24. The direction control will not allow a change in the positions of switches 18 and 20 unless a no-voltage condition is sensed across capacitor 46 (indicating that the motor is not running) and hence prevents direction change without first coming to a substantially full stop. The direction control also prevents a runaway condition by sensing the existence of a voltage across capacitor 46 at a time when the full-on, full-off control 24 is commanding that no voltage be applied to the motor; such a condition may indicate that the power switch 16 has failed in a short-circuit mode and has thereby rendered ineffective the speed and power control normally afforded by the accelerator 26; in the event such a condition is sensed, the direction control acts to return the direction switches 18 and 20 to their normal positions and thus remove battery power from the motor.

The oscillator 26 provides its output pulses to the monostable multi-vibrator 52 comprising the first stage of the full-on, full-off control 24. The monostable multi-vibrator 52, as well as the second monostable multi-vibrator 54, may be two halves of a 74123 integrated circuit which constitutes a double retriggerable monostable multi-vibrator with clear inputs. The oscillator output would then be applied to the trigger input of multi-vibrator 52. The time constant of the multi-vibrator 52 is determined by the voltage across a capacitor 56. Current is provided to this capacitor by the collector current of a transistor 58 which has its base voltage adjusted by the output of the accelerator 22. The accelerator may constitute a potentiometer having a voltage output inversely proportional to its setting. That is, with no pressure on the accelerator it provides a maximum voltage output and that output decreases as the accelerator pedal is pushed down farther. Accordingly, the voltage across the capacitor 56 is inversely proportional to the accelerator setting. The time period of the multi-vibrator is directly proportional to the voltage across the capacitor 56 so that with a low accelerator setting the monostable has a time period which exceeds the period between oscillator pulses received from the oscillator 26. Accordingly, its output is always high.

As the accelerator setting increases and its output decreases, the time constant of the monostable multi-vibrator 52 decreases so it begins to produce output pulses at a rate proportional to the accelerator setting.

The output of the multi-vibrator 52 acts as the input to the second monostable multi-vibrator half 54. The time period of the multi-vibrator 54 is directly proportional to the voltage on a capacitor 60. The current provided to the capacitor 60 is complementary to that provided the capacitor 56. To obtain this current the accelerator output is provided to the base of a grounded collector transistor 70.

The emitter voltage of transistor 70 is inverted by applying it to the emitter of a P.N.P transistor 72. The collector voltage of that transistor, which is the inverse of the accelerometer voltage, is applied to the base of a constant current source transistor 74 which feeds the capacitor 60. Accordingly, the voltage of the capacitor 60 and the time constant of the multi-vibrator 54 increases as the accelerator output is moved in a fastener direction.

A pair of diodes 76 and 78, connected between the capacitors 56 and 60, act as clamping diodes for the regulator 50, which limits the voltage applied to the multi-vibrators 52 and 54.

The waveforms resulting at the outputs of the two multi-vibrators 52 and 54 for various accelerometer settings are illustrated in FIG. 3. The outputs of the oscillator 26, shown at line A, occur at regular intervals and their positive going sides, illustrated in line B, provide retriggering inputs for the multi-vibrator 52. With a minimum accelerator setting the voltage on capacitor 56 is sufficiently high so that the time constant of the multi-vibrator 52 exceeds the period between these retriggering inputs and the output of the multi-vibrator 52 is a constant level voltage, illustrated at line C. As the accelerator is depressed the period of multi-vibrator 52 begins to decrease below the time period between the retriggering inputs and its output goes low for a period proportional to the period between the two. This is illustrated in line D.

As the accelerator is moved in a direction to increase the speed of the vehicle, lowering its voltage output, the period of the first mono-stable multi-vibrator begins to decrease. When its period goes below the interval between the retriggering pulses from the oscillator, its output no longer remains constantly high, but begins to go low before the next oscillator pulse and with an increasing speed signal from the accelerator this low-going signal occurs earlier and earlier with respect to the retriggering oscillator signal. The low-going transition of the first multi-vibrator output triggers the second monostable multi-vibrator into conduction as shown in FIG. 3E. The period of the second monostable is relatively short with low accelerator settings and increases with an increasing accelerator setting. As shown at line F, with a substantial accelerator depression the period of the first multi-vibrator is very short so that its output signal goes low shortly after being initially triggered by the oscillator. Conversely, as shown in line G, the period of the second multi-vibrator is relatively high so that it becomes conductive for the major portion of the time period between a pair of oscillator outputs. Finally, with a full depression of the accelerator, as shown in line H, the first monostable output signal drops low a very short time period after the oscillator signal. At the same time the second multi-vibrator period conduction period exceeds the triggering interval provided by the pulses from the first monostable so the second monostable output is always high. In this manner, the output of the second output multi-vibrator is adjusted between full-on and full-off as a direct function of the accelerator setting.

FIG. 4 is a partially block, partially schematic diagram of a DC motor control circuit of the type illustrated in FIG. 1, incorporating certain supplemental features.

In the circuit of FIG. 4, the direct current motor armature 14 and the field winding 12 are connected in series across a battery 10 through the emitter-collector circuits of three parallel germanium transistors 90, 92 and 94. A current sensing resistor 96 is also disposed in the series path as are three current limiting resistors 98, 100 and 102 connected in series with the emitters of the three transistors. When the three transistors are conductive current is applied to the motor and the direction of rotation of the motor is controlled by a direction control reversing switch 42 connected across the field winding 12. When the transistors 90, 92 and 94 become non-conductive, power stored in the motor field can continue to circulate through a free wheeling diode 38.

A pulse source 104 acts to provide triggering pulses to the full-on full-off dual multi-vibrator 24. The output of the multi-vibrator 24 is controlled by the accelerator 22. The output of the unit 24 is provided to the base of one of a pair of transistors 106, 108 which are connected in a Darlington configuration, through a resistor 110.

Normally, when the output of the multi-vibrator unit 24 is high, the Darlington pair 106 and 108 will be conductive and apply a base voltage to a transistor 112, through a resistor 114, which renders that transistor conductive. The transistor 112 is a germanium transistor. The transistor 112 is back-biased through an emitter resistor 116 and a base resistor 118 both connected to a conventional free-running multi-vibrator voltage doubler 20 powered by the battery 10. This high bias voltage allows the germanium transistors to be used without excess leakage and without the need for a tapped power supply. The resistor 116 also connects to the base of each of the transistors 90, 92 and 94 so that when the transistor 112 becomes conductive, the three parallel transistors become conductive and supply power from the battery 10 to the motor.

In order to prevent excessive current from flowing from the motor through the transistors, the series current sensing resistor 96 is shunted by a capacitor 122 which integrates its output and applies it to the base of an NPN transistor 124. The emitter of that transistor is connected to the mid-point of a voltage divider consisting of a pair of resistors 126 and 128 connected between the collectors of the transistors 90, 92, 94 and ground. Effectively, the transistor 124 compares this emitter voltage with its base voltage and when the base voltage exceeds the emitter voltage the transistor becomes conductive. This grounds the base of the input member 106 of the Darlington pair 106, 108 so that they shut-off and shut-off the transistor 112 which is the triggering transistor for the three parallel germanium transistors 90, 92 and 94. The voltage at the mid-point of the voltage divider 126, 128 is a function of whether the three parallel transistors are conductive. When they are conducting, that voltage is relatively high. When they are not conducting, the voltage at the connection point between the resistors 126 and 128 is substantially lower.

This arrangement provides a hysteresis level to the current shut-off feature so that the power transistors are not immediately turned back on after they shut-off in response to an over-current condition. The current through the resistor 96 must lower to a level appreciably below the level at which it first caused the transistor 124 to conduct before it falls below the voltage across the divider 126, 128 when the power transistors are not conductive.

The circuit of FIG. 4 incorporates a speed regulation feature which tends to prevent rapid speed fluctuations. The full-on, full-off multi-vibrator 24 is retriggered by the output of a voltage controlled oscillator 104. The input voltage for this oscillator is derived from a capacitor 130 connected across the armature 14 through the emitter-collector path of an NPN transistor 132. The base of the transistor 132 is connected to the bases of the power transistors 90, 92 and 94 so that its conduction mode is the reverse of that of the power transistors: when the power transistors are conductive the transistor 132 is non-conductive and vice versa. Accordingly, the transistor 132 is only conductive when no power is applied to the motor from the battery. At such times, the voltage across the armature 14 is equal to its back EMF which is a function of the motor speed. Accordingly, the capacitor 130 develops a voltage proportional to the motor speed which in turn controls the output rate of the voltage controlled oscillator 104. When the motor speed is relatively high, the retriggering pulses are provided to the full-on, full-off multi-vibrator 24 at relatively rapid intervals tending to decrease the output of the multi-vibrator. When the motor speed is relatively low, the retriggering pulses occur relatively low and tend to increase the period of conduction to the multi-vibrator 24. This action tends to damp the speed fluctuations of the motor which would otherwise occur.

We claim:

1. A system for controlling the electrical power applied to a DC drive motor for an electric vehicle, comprising: an operator controlled accelerator operative to provide an output electrical signal proportional to the accelerator position which is continuously variable between limiting values; a multi-vibrator having the output of the accelerator as its input and being operative to provide a periodically cycling bi-stable output wherein the ratio of on-time to off-time is a function of the signal received from the accelerator; a power switching device connected in series with the motor and battery; means for deriving an electrical signal having a value which is a direct function of the instantaneous current passing through the motor; comparator means operative to receive said instantaneous current signal and a reference value and to provide an output signal at such time as the current passing through the motor exceeds the reference value; and a gate for controlling said switching device, to pass current from the battery to the motor only and at all times when the output of the multi-vibrator is in an "on" state and a signal representative of the instantaneous value of the current passing through the motor does not exceed said reference signal.

2. The system of claim 1 wherein the reference value has a first level at such time as the switching device is closed and a second lower level at such time as said switching device is open; whereby, when the switching device is opened by virtue of the instantaneous current passing through the motor exceeding the first reference value, the switching device remains open until the instantaneous current passing through the motor falls below said second lower level.

3. The system of claim 1 wherein the power switching device connected in series with the motor and battery consists of a plurality of semi-conducting devices connected in parallel.

4. The system of claim 1 wherein said multi-vibrator includes a plurality of triggering one-shot multi-vibrators, one having the output of the other as its triggerable input and one of the multi-vibrators has a period directly proportional to the output electrical signal of the accelerator and the other has a period inversely proportional to the output electrical signal of the accelerator.

5. The system of claim 1 wherein said switching device consists of a plurality of germanium transistors having their emitter-collector paths connected in parallel and having a bias voltage applied to their base which exceeds the voltage of the battery.

* * * * *